Patented Apr. 12, 1949

2,467,146

UNITED STATES PATENT OFFICE 2,467,146

LUBRICANT

Arnold J. Morway, Clark Township, Union County, and John C. Zimmer, Union, N. J., assignors to Standard Oil Development Company, a corporation of Delaware No Drawing. Application December 30, 1944, Serial No. 570,779

5 Claims. (Cl. 252—29)

This invention relates to lubricants, and in particular to lubricants of grease characteristics insoluble in hydrocarbons and hydrocarbon derivatives.

Lubricating compositions having relatively solid consistencies have been employed from early times as gasoline and hydrocarbon insoluble products. The solid lubricants consisted generally of hydrocarbon insoluble materials thickened with large percentages of sodium soap. They generally contained a considerable portion of water incorporated in their structure, with the result that any extremes in temperature were sufficient to decompose or freeze them solid.

The compositions of the present invention depart from such type grease compositions in that when certain carbon blacks are incorporated in a variety of petroleum-insoluble liquids characterized by a smooth, viscous consistency at atmospheric conditions compositions of grease-like consistency and a grease-like behavior substantially stable at high temperatures are obtained. These lubricating compositions have been found particularly suitable for temperature conditions and reaction systems for which greases prepared from petroleum distillates or the usual hydrocarbon insoluble greases are wholly unsuitable. The carbon blacks which have been found suitable in this capacity are those commonly termed the structure blacks. These materials, well known in the ink and paint and dry battery industries are characterized by forming an apparent reticulate structure when dispersed in the liquid medium and viewed under an electron microscope at sufficient magnification to resolve the carbon black structure. These carbons apparently form colloidal gels in a variety of organic liquids including the liquid petroleum distillates above the naphtha range, and impart a thickening effect to mineral lubricating oils similar to that of grease-forming soaps. Particular members of the class are acetylene black and the various channel blacks prepared from natural gas.

The suitable organic compounds employed as the liquid base in the preparation of the lubricants of the invention are petroleum insoluble substances of smooth, viscous character previously known to have unctuous properties such as the non-drying oils and fats, castor oil, glycerine, glycols, the polyglycols, polyvinyl alcohols, pentaerythritol, sorbitol, sorbitan esters and sugar syrup. It has been found, for example, that when a structural carbon black is suitably dispersed in glycerine the composition is suitable for the lubrication of valves operating under the combined effects of low and high temperatures. Thus the compositions are suitable for the valves, packing bearings and other parts needing lubrication in the manufacture of synthetic rubber materials in the presence of methyl chloride at low temperatures such as butyl rubber in which methyl chloride is used as a solvent and refrigerant. In this service the methyl chloride on the high pressure side of the compressors is subjected to temperatures of around 350° F., whereas on the expansion side the temperature may be as low as −70° F.

The grease composition prepared by suitably dispersing structure carbon black in glycerine has been found highly satisfactory for the lubrication of valves and systems exposed to the double effect of extreme temperatures, whereas greases prepared from petroleum distillates were wholly unsuitable because of their being readily lost by the solvent action of the methyl chloride.

EXAMPLE I

As an illustration of a composition of the invention 18% carbon black of particle size below about 40 millimicrons, commonly used as an ink black was compounded with 82% glycerine by working the carbon black into the glycerine by means, such as a roller mill, a Lancaster disperser or by high viscosity milling equipment. These means are particularly necessary for the such high surface, small particle carbon blacks as the ink blacks of which that mentioned above is an example. For structure blacks, such as acetylene black, however, a common well scraped kettle is usually sufficient.

The product thus prepared does not appear to melt. If the temperature of the composition, however, is raised sufficiently high, for instance above the boiling point of the glycerine, the glycerine volatilizes leaving the carbon black as a soft, fluffy non-abrasive residue which can be re-dispersed in glycerine, also, when in use as plug lubricants for valves, they are under sufficient pressures to result in any loss of the glycerine being highly improbable. The lubricant can be employed at relatively low temperatures such as −100° F. because of its content of glycerine as a major constituent. The degree of thixotropy retained by the product allows for the valves to be easily turned without excessive exertion and as soon as the turning shear is removed the lubricant immediately sets up again acting as a very efficient seal.

The lubricant was used in the #1 Zenith pump. Based on specifications given by the Zenith Company, the pump used should deliver 19.8 cc./5 min. if no slipping occurs through the gear casing. With grease as supplied initially with the pump, delivery up to 100 pounds per square inch pressure was obtainable. During the first two days of tests, however, the pressure output slowly dropped down to 40 pounds per square inch. At shut down time, the pump was capable of delivering 25 pounds per square inch pressure.

As can be seen from the following data, the pump ran a total of 31.17 hours with the grease of this invention, giving consistent delivery from start to finish.

*Glycerine pump lubricant*

October 9, 1944:
- 10:45 a. m.—start up.
- 12:45 p. m. _____ 19.1 cc./5 min.
- 1:45 p. m. _____ 19.6 cc./5 min.
- 1:47 p. m.—shut down.

October 10, 1944:
- 9:00 a. m.—start up.
- 9:20 a. m. _____ 19.4 cc./5 min.
- 11:00 a. m. _____ 19.6 cc./5 min.
- 1:00 p. m. _____ 19.4 cc./5 min.
- 3:00 p. m. _____ 19.8 cc./5 min.
- 4:30 p. m.—shut down.

October 11, 1944:
- 8:40 a m.—start up.
- 10:00 a m. _____ 19.8 cc./5 min.
- 12:00 noon _____ 19.8 cc./5 min.
- 1:00 p. m. _____ 19.8 cc./5 min.
- 2:00 p. m. _____ 19.8 cc./5 min.
- 3:30 p. m. _____ 19.8 cc./5 min.
- 4:00 p. m.—shut down.

October 12, 1944:
- 8:30 a. m.—start up.
- 9:00 a. m. _____ 19.8 cc./5 min.
- 10:00 a. m. _____ 19.8 cc./5 min.
- 12:00 noon _____ 19.8 cc./5 min.
- 2:00 p. m. _____ 19.8 cc./5 min.
- 3:00 p. m.—shut down.

October 13, 1944:
- 8:30 a. m.—start up.
- 9:00 a. m. _____ 19.8 cc./5 min.
- 12:00 noon _____ 19.8 cc./5 min.
- 2:00 p. m. _____ 19.8 cc./5 min.
- 4:00 p. m.—shut down.

The lubricant of Example I was applied to the gears at the beginning of a test run. For the test, 54° A. P. I. gravity naphtha was used, a total quantity of approximately 250 cc. was charged at the beginning and this was recycled throughout the entire run. The naphtha maintained its original color throughout the entire run and was not discolored by the carbon black in the lubricant. The pump was run only during the daytime, readings being taken on an average of every two hours.

An improved composition containing both glycerine and structure black can be prepared by the incorporation in the mass during preparation of between 1% and 5% of the solid polyglycols or viscous vinyl alcohol polymers.

EXAMPLE II

Another type of composition prepared according to the invention has the following composition.

| | Per cent |
|---|---|
| Acetylene carbon black | 11.0 |
| Castor oil #3 lubricating grade of ASTM penetration—290 mm./10 | 89.0 |

This composition is prepared as in Example I. This composition is suitable as a lubricant and sealing composition in services involving the handling of petroleum oils, naphthas and gases. In the packing glands of gasoline pumps, in carburetors and in acid-treating agitators in refinery service the above composition has given outstanding service.

As an example of this service, the product of Example II was used to lubricate the packing glands on a battery of agitators used to contact refinery gases with $H_2SO_4$ in one of the operations in the formation of secondary butyl alcohol. Here due to entrainment of the gases and liquids some considerable pressure occurs at the packing gland closure between the agitator shaft and the agitator casing. The material exerting pressure against the gland consists of liquid petroleum products of excellent solvent properties, sulfuric acid, water and gaseous materials being bled into the agitators. Previous to the use of the product described in Example II normal petroleum insoluble products consisting of soap and castor oil and glycerine were employed. These materials were satisfactorily insoluble in the hydrocarbon naphthas and gases but were charred by the acid present and washed away by the water present, and considerable wear occurred on the shafts due to the poor lubrication imparted between the packing and the agitator shaft resulting in the use of soft packings requiring early replacement. In addition, these lubricants contained large quantities of soap and were of a high consistency necessitating manual lubrication. Due to the present wartime manpower situation, a centralized mechanical lubrication system was employed. The previous lubricant was entirely too hard to be used in this lubrication system, and when a steam coil was placed in the lubrication reservoir of the system, complete separation occurred in the lubricant on the application of heat resulting in soap clogged pipe passages and what lubricant did pass through consisted of only the liquid media which immediately passed through the packing into the agitator. When the product of Example II was employed, having a N. L. G. I. #2 [1] consistency, it was easily pumped through the circulating system of the lubricator without separation. Positive lubrication was obtained at the packing gland with the result that harder packings were permissable with the complete elimination of gassing (gas leakage), or leakage of liquid.

Due to the presence of the hydrocarbon and sulfur-containing gases and the action of the sulfuric acid, the conventional type lubricants easily carbonize resulting in the formation of abrasive residues which cause considerable wear especially upon the propeller shaft, and in the packing with the result that leakages develop and cause operation hazards. The composition of this invention, however, gives perfect lubrication to the packing, resulting in considerable less wear and longer life. It also acts as a seal preventing the escape of gas through the gland. It is insoluble in strong and dilute acid and is unaffected by hydrocarbons. The consistency of the composition is such as can be pumped in a Farval or other automatic centralized lubricating system. Furthermore, the range of consistency change with temperature is small and these temperature variations have little effect on the lubricant.

The polybutenes, acryloids or other chemically inert thickening compounds may also be incor- ---
[1] National Lubricating Grease Institute.

porated in composition of the invention in order to impart added consistency. In addition also, paraffin and petrolatum waxes and the higher alcohols may also be blended in the compositions. If desired, various additives such as extreme pressure agents, sulfurized fatty oils, metal soaps, mercaptides, xanthates, or stabilizers or antioxidants particularly amines, phenols, naphthols, or polyhydroxy phenols known to have a stabilizing effect on castor oil, glycerine and the like may be incorporated in the composition to obtain special characteristics in accordance with the established art on lubrication.

What is claimed is:

1. A colloidal lubricating grease composition substantially insoluble in hydrocarbon oils consisting essentially of a viscous unctuous mineral oil insoluble material selected from the group consisting of glycerin and petroleum insoluble non-drying glycerides of fatty acids, said material being thickened to a grease-like consistency by incorporation therein of about 11 to 18% by weight, based on the total composition, of acetylene carbon black.

2. A composition according to claim 1, wherein there is also incorporated 1 to 5% by weight, based on the total composition, of a chemically inert polymer of alcohol derivation.

3. A lubricant according to claim 1 in which the mineral oil insoluble viscous liquid is glycerine.

4. A lubricant according to claim 1 in which the mineral oil insoluble viscous liquid is castor oil.

5. A lubricant consisting essentially of castor oil and about 11% acetylene carbon black.

ARNOLD J. MORWAY.
JOHN C. ZIMMER.

REFERENCES CITED

The following references are of record in the file of this patent:

UNITED STATES PATENTS

| Number | Name | Date |
|---|---|---|
| 1,590,800 | Becker | June 29, 1926 |
| 1,737,555 | Baldwin | Dec. 3, 1929 |
| 1,854,237 | Teeple | Apr. 19, 1932 |
| 2,079,783 | Wiezevich | May 11, 1937 |
| 2,345,198 | Hodson | Mar. 28, 1944 |
| 2,349,058 | Swenson | May 16, 1944 |
| 2,356,367 | Wright | Aug. 22, 1944 |

OTHER REFERENCES

Canadian Chem. & Metallurgy, vol. 17, May 1933, article by Kaufmann entitled "Acetylene Carbon Black," pages 93-95 inclusive.

"Uses and Applications of Chemicals and Related Materials," Reinhold Publishing Corporation, New York, 1939, Thomas C. Gregory. (Copy in Division 64.)